United States Patent [19]

Zuran et al.

[11] Patent Number: 5,453,574
[45] Date of Patent: Sep. 26, 1995

[54] ECO-GRILL PAN

[76] Inventors: Johann Zuran; Dietmar Zuran, both of Köpenicker Str. 161, D-1000 Berlin 47, Germany

[21] Appl. No.: 23,938

[22] Filed: Feb. 26, 1993

Related U.S. Application Data

[63] Continuation-in-part of Ser. No. 13,782, Feb. 5, 1993, Pat. No. 5,347,978.

[30] Foreign Application Priority Data

Feb. 5, 1992 [DE] Germany .......................... 42 03 726.3
Feb. 26, 1992 [DE] Germany .......................... 42 06 453.8

[51] Int. Cl.$^6$ ..................................... F24C 3/00
[52] U.S. Cl. ..................... 126/41 R; 126/25 R; 126/332; 99/445
[58] Field of Search ................... 126/41 R, 332, 126/221, 211, 25 R; 99/444, 445

[56] References Cited

U.S. PATENT DOCUMENTS

| | | | |
|---|---|---|---|
| 2,940,381 | 6/1960 | Cottongim et al. ............... | 126/25 R X |
| 3,989,028 | 11/1976 | Berger ............................. | 126/25 R X |
| 4,930,491 | 6/1990 | Purello ............................ | 126/332 |
| 5,121,738 | 6/1992 | Harris ............................. | 126/41 R |

FOREIGN PATENT DOCUMENTS

| | | |
|---|---|---|
| 0214439 | 7/1986 | European Pat. Off. . |
| 2439570 | 2/1976 | Germany . |
| 8804071 | 6/1988 | Germany . |

*Primary Examiner*—Larry Jones
*Attorney, Agent, or Firm*—Notaro & Michalos

[57] ABSTRACT

An eco-grill pan comprises a flat bowl having a bottom. The bottom has a collecting channel therein and a plurality of elevations extend upwardly from the bottom. The elevations have at least two sides and pairs of elevations define a valley therebetween. At least one side has an opening therethrough an at least one impression in the side near the opening. The collecting channel of the bottom is transverse to the elevations. The drill pan is of a one-piece casting construction.

3 Claims, 2 Drawing Sheets

ECO-GRILL PAN

CROSS REFERENCE TO RELATED APPLICATIONS

This application is a continuation-in-part of 08/013,782 filed Feb. 5, 1993, now U.S. Pat. No. 5,347,978, issued Sep. 20, 1994.

BACKGROUND OF THE INVENTION

1. Field of the Invention

The invention relates to an apparatus for roasting food items, in particular meat meals with the aid of wood, gas, electric grilling apparatus or other devices for heating.

2. Description of the Prior Art

A known apparatus of this type (DE 41 16 809 A1) for roasting and grilling food items comprises sheet metal in the form of a flat bowl, has a corrugated bottom with alternating elevations and valleys. In the valleys is disposed a multiplicity of openings which make possible the penetration of fat droplets.

The second embodiment of this apparatus has openings—recesses disposed on the highest points of the elevations.

Both designs of this apparatus have the disadvantage that during grilling due to the openings present—less so in the second embodiment—the fat drips into the heat source and burns with strong soot and smoke formation.

Herein the problem of the formation of health-endangering carcinogens exists, primarily the formation of 3,4-benzpyrene known as being carcinogenic, and they are carried with the rising soot to the grilling goods.

A further known grilling pan (DE-GM (utility paten) 82 28 063.0) is increasingly used today for grilling or roasting. It comprises a single metal foil with an encircling flanged border and a corrugated grilling surface. In this apparatus are punched into the swellings recesses through which takes place the direct radiation of the grilling goods. But these conditions unfortunately lead to the fact that at these sites the fat also drips into the heat source and burns. The remaining fat present in the grooves is difficult to pour off since the entire apparatus is too flexible.

Since this apparatus is a disposable product it moreover does not meet ecological aspects.

SUMMARY OF THE INVENTION

The invention is based on the task of making available cost-efficient and permanently reusable grilling pans with reduction of environmental load and unimpaired use being fully met.

This task is solved according to the invention thereby that the grilling pan is made of a single piece, and that the corrugated bottom implementation comprising alternating valleys and elevations has ventilation openings with impressions in the slopes of the elevations.

The ventilation openings permit the hot air coming from below and the charcoal gases to flow around the grilling goods. The impressions prevent the fat from dripping into the fire. The fat flowing from the grilling goods can in this way flow off into the valleys and can be distributed through the transverse fat collecting channel. The fat collecting channel additionally facilitates pouring off the fat.

The valleys and elevations of the corrugated bottom of the grilling pan can have different geometric shapes in cross section, such as for example acute, acute rounded, semicircular, trapezoidal, rectangular, sawtooth-form, house-shaped and combined shapes.

The slopes can have the ventilation openings either on one side or both sides, wherein the impressions below the openings are implemented inwardly and above the openings outwardly.

The eco grilling pan according to the invention can be produced of a single piece comprising a Niro steel sheet, aluminjure sheet or steel sheet with a food-friendly coating. It can also be realized as a cast piece with corresponding coating.

BRIEF DESCRIPTION OF THE DRAWINGS

In the following the invention will be explained in further detail in conjunction with the drawing. Therein show.

DESCRIPTION OF THE PREFERRED EMBODIMENTS

Figure 1:
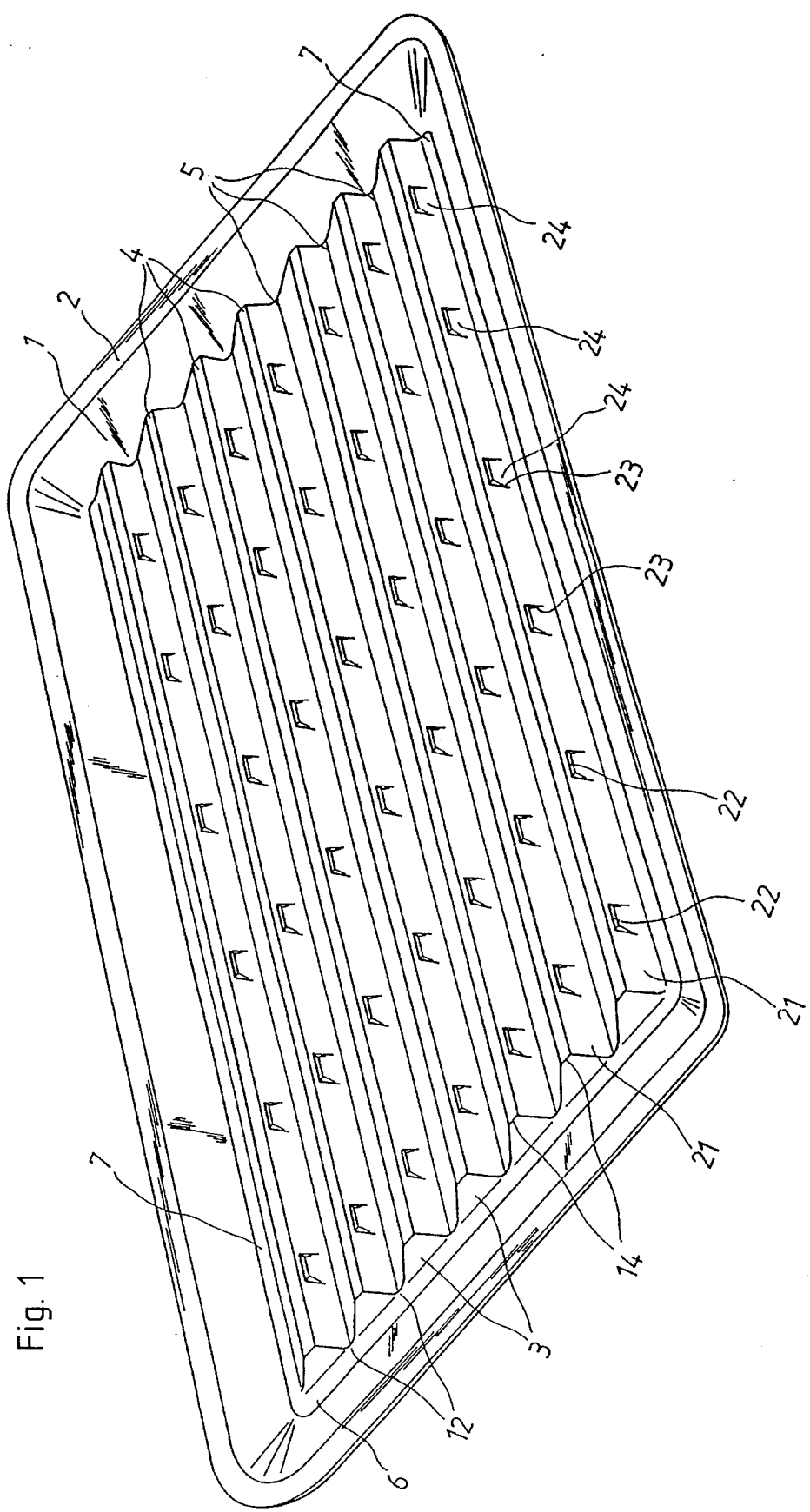
FIG. 1 perspective representation of an embodiment example of the apparatus according to the invention with trapezoidal and acute-rounded bottom implementation as well as ventilation openings punched into the slopes with the impressions being implemented as flat impression shapes.
Figure 2:
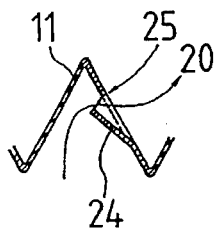
FIG. 2–8 show each schematically a partial section through an elevation and ventilation opening of the slope of the formed bottom for different embodiment examples and specifically acute, acute rounded, rounded, trapezoidal, rectangular rounded, sawtooth-form, house-form shape of the bottom of the stated invention.
Figure 3:
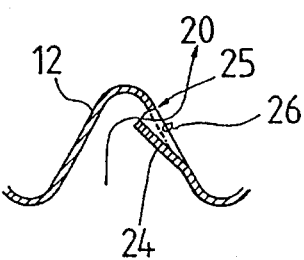
Figure 4:
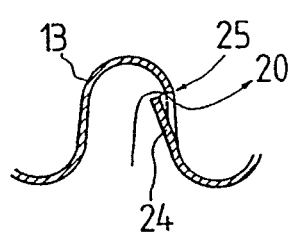
Figure 5:
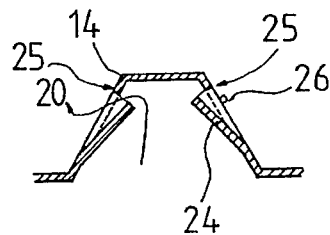
Figure 6:
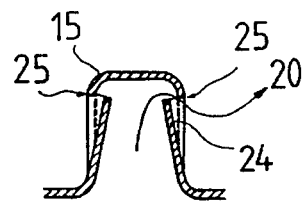
Figure 7:
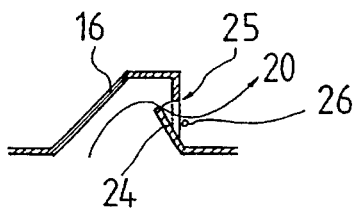
Figure 8:
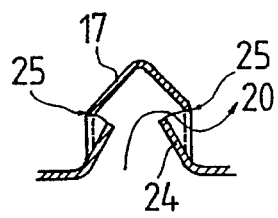
Figure 14:
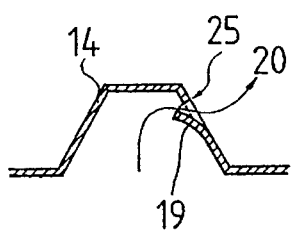

According to the invention a grilling pan 1 is made of a single piece of steel or aluminum, and has a flat corrugated bottom comprising alternating valleys 5 and elevations 3 with ventilation openings 22 made of pressed-in impressions 23 on at least one slope 21 of each elevation. A border 2 extends upwardly around the bottom so that the pan is like a flat-bowl. A fat collecting channel 6, 7 additionally facilitates pouring off fat and extends inside border 2, around the corrugated bottom. The valleys and elevations of the corrugated bottom of the grilling pan can have different geometric shapes in cross section, such as for example, acute angles 11 as in FIG. 2, acute rounded 12 as in FIG. 3, semicircular 13 (FIG. 4) trapezoidal 14 (FIG. 5 and 14), rectangular 15 (Fib. 6), sawtooth-form 16 (FIG. 7), house-shaped 17 (FIG. 8) and combined shapes. The slopes can have the ventilation openings either on one side (e.g., FIG. 14) or both sides, wherein the impressions 23 below the openings are implemented as inwardly and upwardly extending tongues 24 that end at the upper opening 22.

Figure 9:
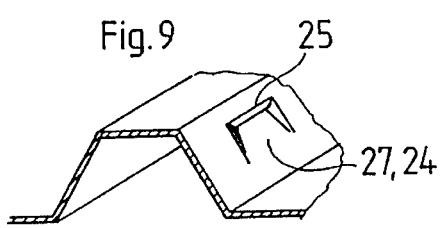
FIG. 9–11 show perspective partial views of an opening with the impression shape:
 9: flat impression shape
 10: rounded impression shape
 11: triangular impression shape
Figures 10, 11:
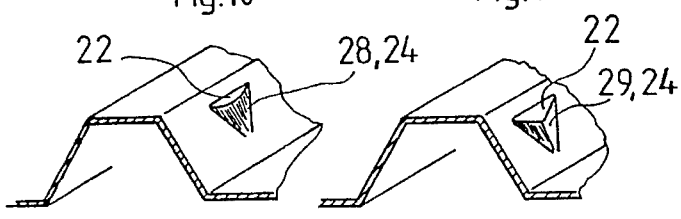
Figure 12:
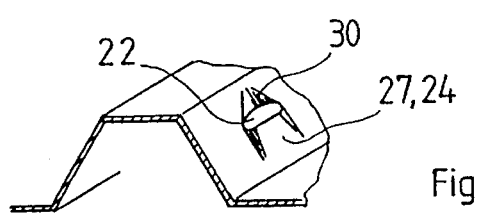
FIG. 12–13: perspective partial view of an opening with inner and outer impression of the slope FIG. 14 partial section through an elevation and ventilation opening of the slope with the tongue of the impression being bent.
Figure 13:
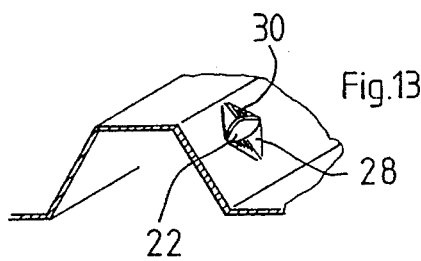

As shown in the Figures, gas 20 can escape around the inside surface of tongue 24 and under a drip edge 25 that overhangs at the top of each opening 22, so that fat 26 can drip onto the inwardly and upwardly sloping tongue 24 and into an adjacent valley 5. In FIG. 9, the tongue can be rectangular at 27 or in FIGS. 10 and 11, V-shaped at 28 and 29. A second impression 30 can also be provided as shown in FIGS. 12 and 13, above opening 22.

We claim:

1. A grill pan comprising:
    a flat bowl having a bottom, the bottom having a collecting channel therein and a raised border around the channel,
    a plurality of elevations extending upwardly from the bottom and having at least two sides, each pair or adjacent elevation defining a valley therebetween, the elevations and valleys being within the channel;
    at least one side of each elevation having a plurality of openings therethrough and at least one pressed-in impression in said one side below each opening, each impression forming an inwardly and upwardly sloping tongue, said one side above each opening having an overhang drip edge overhanging each opening respectively so that fat on the drip edge drips onto the tongue and not into the opening, while gas escapes through the opening and under the drip edge; and
    the grill pan with its bottom, channel, border, elevations, valleys, tongues and impressions being of a one-piece metal construction.

2. The grill pan according to claim 1, including additional impression located on the at least one side above the opening.

3. The grill pan according to claim 1, wherein the at least two sides of the elevations have an opening therethrough.

* * * * *